United States Patent [19]

Hilbig

[11] Patent Number: 4,472,256
[45] Date of Patent: Sep. 18, 1984

[54] ELECTROLYTIC POOL CHLORINATOR

[76] Inventor: Herbert H. Hilbig, 3125 W. Paradise Dr., Phoenix, Ariz. 85029

[21] Appl. No.: 513,674

[22] Filed: Jul. 13, 1983

[51] Int. Cl.³ .................. C25B 15/08; C25B 9/00; C25B 11/03; C25B 13/04
[52] U.S. Cl. .................. 204/266; 204/278; 204/149; 204/128; 210/169; 210/754
[58] Field of Search ............ 204/149, 128, 263, 266, 204/271, 278, 252; 210/169, 754

[56] References Cited

U.S. PATENT DOCUMENTS

| | | |
|---|---|---|
| 914,856 | 3/1909 | Meyer . |
| 3,223,242 | 12/1965 | Murray .................. 210/139 |
| 3,356,460 | 12/1967 | King et al. ............... 23/272 |
| 3,563,879 | 3/1967 | Richards et al. ........... 204/272 |
| 3,764,499 | 10/1973 | Okubo et al. ............. 204/149 |
| 3,864,090 | 2/1975 | Richards ................. 23/267 E |
| 3,972,794 | 8/1976 | Lamm .................... 204/266 |
| 4,097,356 | 6/1978 | Yates .................... 204/237 |
| 4,136,005 | 1/1979 | Persson et al. ........... 204/266 |
| 4,229,272 | 10/1980 | Yates .................... 204/128 |
| 4,256,552 | 3/1981 | Sweeney .................. 204/98 |
| 4,260,587 | 4/1981 | Braden ................... 422/282 |
| 4,290,873 | 9/1981 | Weaver ................... 204/228 |
| 4,303,515 | 12/1981 | Rademacher .............. 210/169 |

OTHER PUBLICATIONS

*Chemical Engineers' Handbook*, Fifth Edition, McGraw-Hill Book Co., 1973, pp. 18-19 and 18-20.
"Knight Tower Packings", Brochure Number TP-108A, distributed by Koch Engineering Company, Inc., Maurice A. Knight Division.
"The Chlorine Factory" Brochure, published unknown, believed to have been distributed before 1982.
*Chlorine Production Processes*, edited by J. S. Robinson, published by Noyes Data Corporation, Copyright 1981 Edition, pp. 372-373.
E-Z Clor Systems, "R-3AF Manual", published by E-Z Clor Systems, Division of Airwick Pool Products, Inc., St. Peters, Missouri.

Primary Examiner—Brian E. Hearn
Assistant Examiner—Nathan Thane
Attorney, Agent, or Firm—Cahill, Sutton & Thomas

[57] ABSTRACT

An electrolytic pool chlorinator for chlorinating a swimming pool or the like generates chlorine gas by electrolyzing a sodium chloride solution. A baffle within an anode chamber of the chlorinator isolates undissolved salt from an anode element while collecting chlorine gas liberated at the anode element. A level indicator slidingly extends downwardly into the anode chamber to indicate the level of undissolved salt therein. Chlorine gas collected by the baffle is intermixed with water in a packed column and discharged into a feeder tank. The feeder tank includes a float valve for regulating the flow of water into the packed column and out of the feeder tank.

18 Claims, 11 Drawing Figures

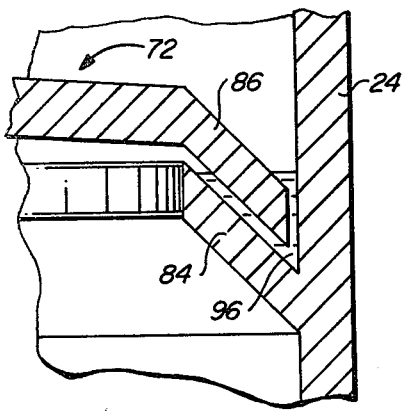
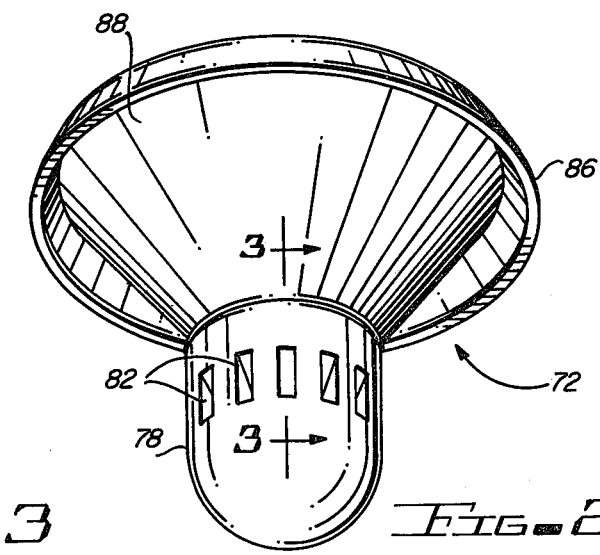
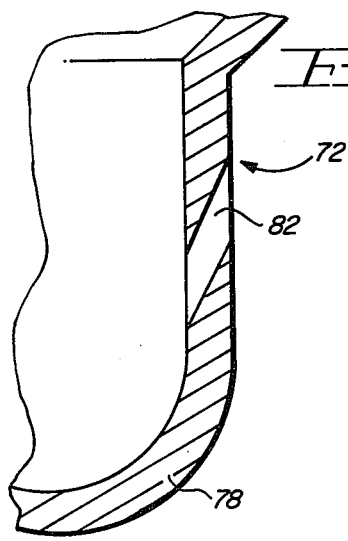
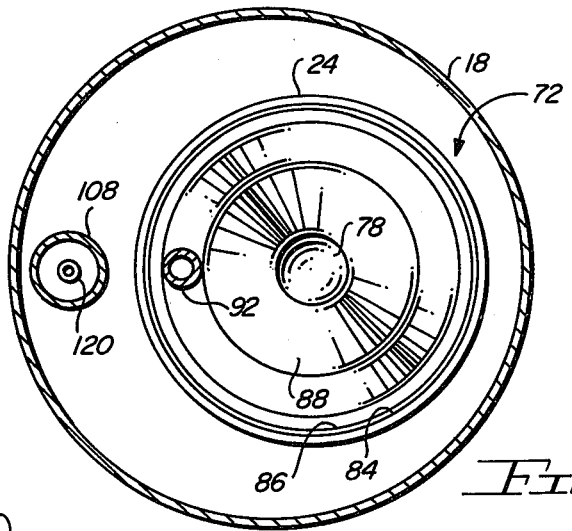
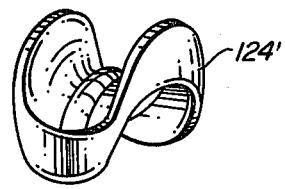
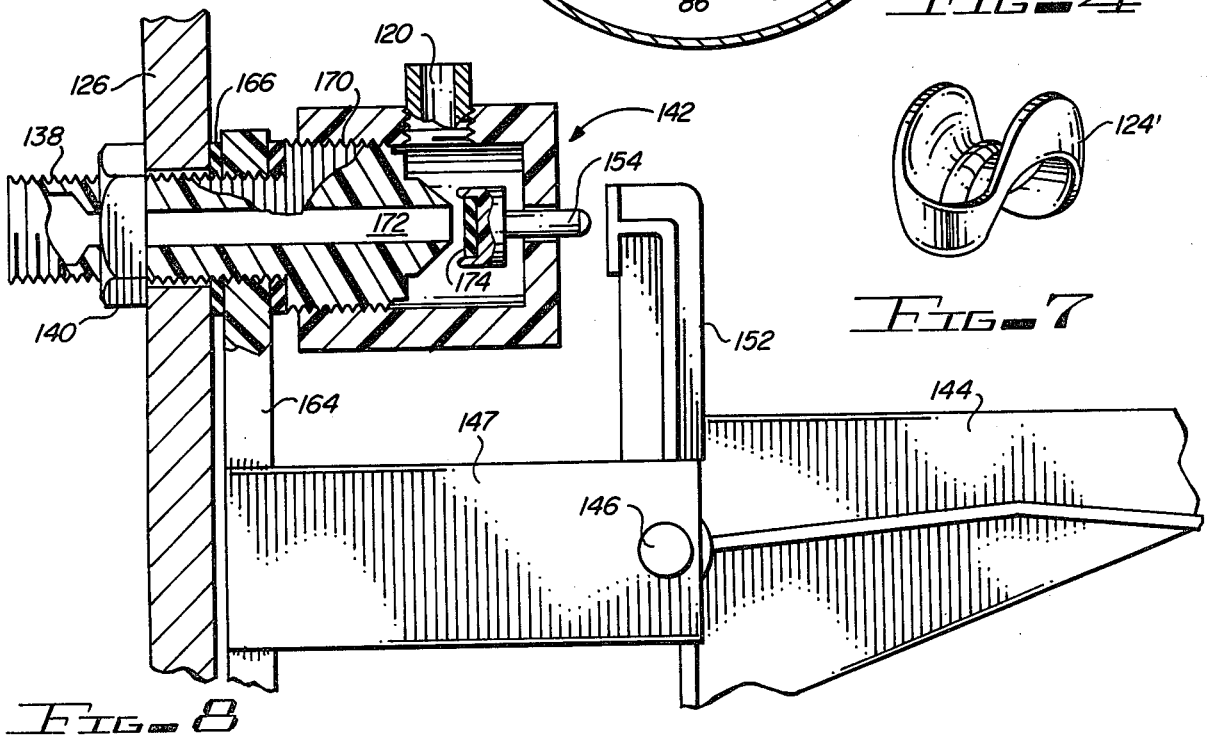

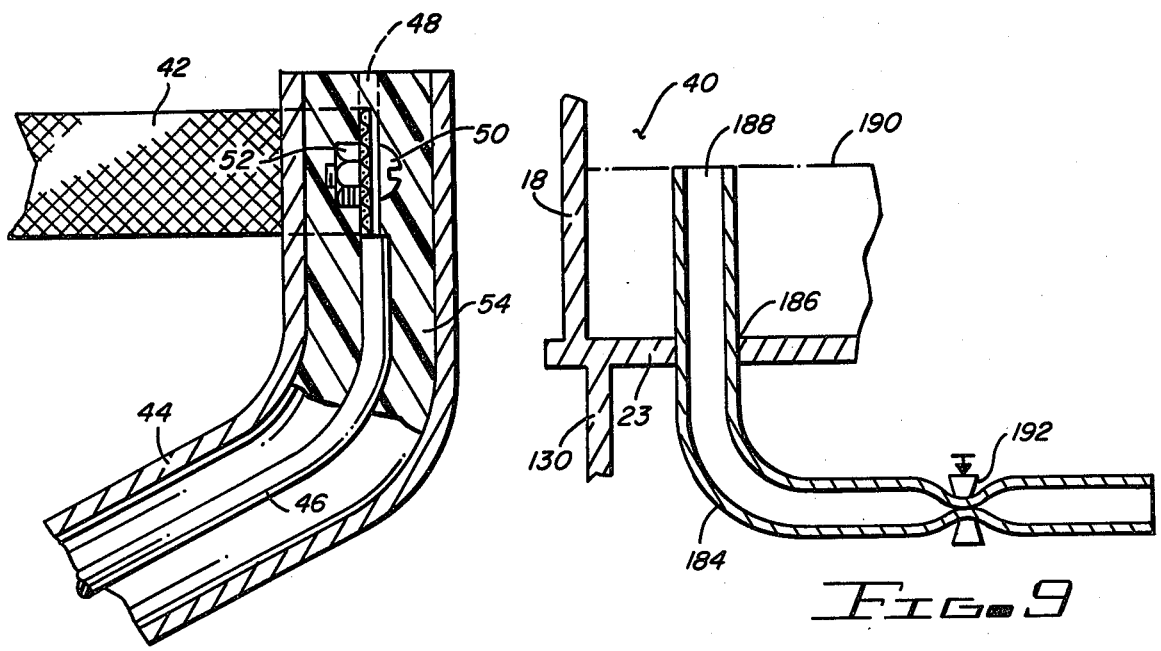
FIG-6
FIG-9
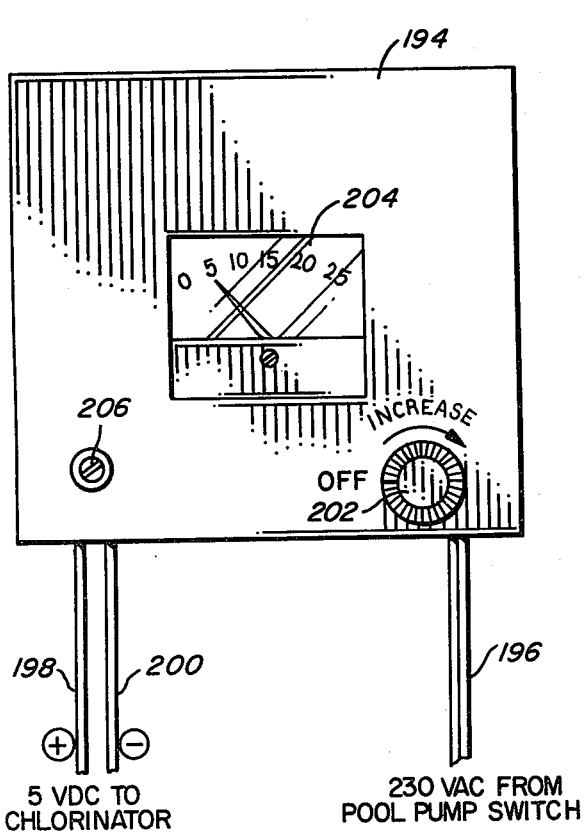
FIG-10
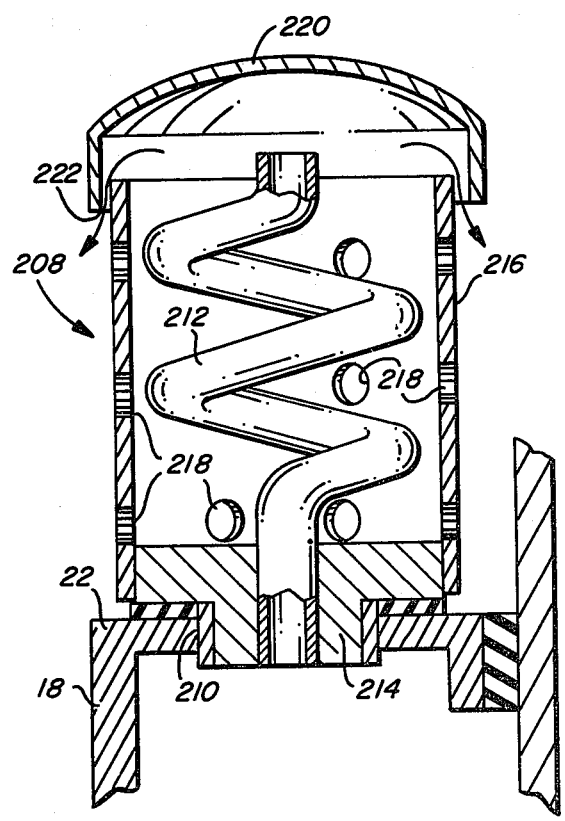
FIG-11

ELECTROLYTIC POOL CHLORINATOR

BACKGROUND OF THE INVENTION

1. Field of the Invention

The present invention relates generally to electrolytic pool chlorinators for chlorinating swimming pools of the like, and more particularly, to an electrolytic pool chlorinator incorporating a uniquely designed baffle to collect liberated chlorine gas while isolating undissolved salt from the anode of the chlorinator, and incorporating a packed column to intermix and react the liberated chlorine gas with a flow of water.

2. Description of the Prior Art

Electrolytic pool chlorinators are well known in the art and are exemplified by the following U.S. Pat. No. 914,856, issued to Meyer; No. 3,223,242, issued to Murray; No. 3,563,879, issued to Richards et al.; No. 4,097,356, issued to Yates; No. 4,256,552, issued to Sweeney; and No. 4,290,873, issued to Weaver. Such electrolytic pool chlorinators generally operate by electrolyzing a sodium chloride solution contained within an anode cell, attracting positively charged sodium ions to a negatively charged cathode and liberating chloride gas at the anode. The chlorine gas released thereby may then be used to chlorinate the water within a swimming pool, spa, or the like; the chlorine gas may also be used to chlorinate drinking water or sterilize sewage effluent.

The anode and cathode cells of such an electrolytic pool chlorinator are typically separated from one another by an ion-permeable barrier to prevent the liberated hydrogen and chlorine gas from mixing with one another and to minimize contamination of the sodium chloride solution within the anode cell by sodium hydroxide (caustic soda) formed within the cathode cell.

Once chlorine gas is generated within the anode cell, it must be intermixed within the body of water to be chlorinated to form hypochlorous acid in order to sterilize the water within the swimming pool or other body of water. U.S. Pat. No. 3,233,242 to Murray, and U.S. Pat. No. 4,290,873 to Weaver, each disclose a venturi formed within the water recirculating system of a swimming pool wherein a conduit communicating with the anode cell is coupled to a restricted throat portion of the venturi. A zone of low pressure is formed within the throat portion of the venturi due to the increased velocity of the water flowing therethrough for intermixing chlorine gas with the recirculated swimming pool water. However, such venturis require a relatively large volume of water to adequately withdraw chlorine gas from the anode cell of the electrolytic pool chlorinator and completely react such chlorine gas with the water.

While the water recirculation pipes normally used within most swimming pool systems to pump the pool water through a filter and back to a pool may have sufficient flow rates to permit such a venturi to be used to react the chlorine gas with the pool water, the formation of the venturi within such water recirculation pipes requires substantial modifications to such pipes. In addition, the formation of such a venturi within the swimming pool water recirculating pipes create additional back pressure on the recirculating pump, causing the pump to work harder. On the other hand, if only a portion of the recirculated water is diverted from the water recirculating pipes and caused to flow through a venturi, the reduced volume of water flowing through the venturi may be inadequate to completely react the liberated chlorine gas with the pool water; in this event, not only is some of the liberated chlorine gas wasted but also a safety problem may arise due either to accumulations of pressurized chlorine gas within various elements of the swimming pool or to leakage of unreacted chlorine gas therefrom.

U.S. Pat. No. 4,229,272 issued to Yates discloses a chlorine generator including a gas feed system having a tank constructed to receive chlorine gas and having a water inlet metered by a float valve. A gas trap region is formed by a downwardly depending plate into which the chlorine gas is introduced for mixing with the water in the tank. However, no mechanism is provided for actively reacting the chlorine gas with the water in the tank. U.S. Pat. No. 4,290,873 issued to Weaver describes a mixing cylinder for use with pool not having filter and pump systems. The mixing cylinder includes a venturi for suctioning chlorine gas into a flow of water and discharges the flow of water into the mixing cylinder. A float-controlled standpipe controls the outflow of water from the mixing cylinder.

Neither of the aforementioned U.S. Pat. Nos. 4,229,272 and 4,290,873 would appear to describe chlorine gas/water mixing apparatus which is capable of efficiently and completely reacting chlorine gas with relatively small quantities of water and thereby preventing dangerous accumulation of unreacted chlorine gas.

Prior art chlorinators are known to the present inventor wherein the anode chamber is vented to the atmosphere for preventing pressurized accumulations of chlorine gas within the upper portion of the anode chamber and for admitting air to prevent negative pressures from being created within the anode chamber when the liberated chlorine gas is suctioned at a rate faster than that at which it is being generated. However, such venting of the anode chamber may permit air to become mixed with the liberated chlorine gas and render it more difficult to react the liberated chlorine gas with water being returned to the pool.

Electrolytic pool chlorinators generate heat due to the electrical resistance within the electrolytic cell which opposes the conduction of current therein. Excessive heating of the chlorinator reduces its efficiency and tends to create caustic soda vapor within the cathode cell. This caustic soda vapor, if vented from the cathode cell, condenses upon the exterior of the chlorinator or the surrounding area and deposits dangerous caustic soda thereupon.

It is desirable to prevent accumulations of hydrogen gas within the cathode cell in view of the explosive nature of hydrogen gas. One manner of limiting accumulations of hydrogen gas within the cathode cell is to maintain the level of water within the cathode cell relatively near the upper end thereof, thereby limiting the available volume in which hydrogen gas may accumulate. It is also known in the art to provide a series of vents at the upper end of the cathode cell through which liberated hydrogen gas may be dispersed to the atmosphere. However, during operation of the electrolytic pool chlorinator, water within the anode cell tends to migrate toward the cathode cell, thereby raising the fluid level within the cathode cell; consequently, unless an overflow relief is provided, the cathode cell would ultimately become entirely filled by sodium hydroxide solution, eventually resulting in spillage of caustic soda through the hydrogen gas vents. U.S. Pat. No. 3,223,242 issued to Murray discloses an overflow outlet disposed within the upper end of the cathode cell for emptying excess sodium hydroxide solution from the cathode cell. Yet, Murray does not disclose any means for safely and conveniently disposing of the highly caustic sodium hydroxide solution which periodically overflows from the cathode cell.

Among those difficulties which have been experienced with prior art electrolytic pool chlorinators is the determination of the level of undissolved sodium chloride within the anode cell. Typically, the upper end of the anode cell is covered by a plate or lid which must be removed in order to view the contents of the anode cell. The need to remove the lid or plate covering the anode cell is often objectionable to the user due to the inconvenience necessitated thereby and the exposure of the user to latent chlorine fumes. Within U.S. Pat. No. 4,290,873 issued to Weaver, it is suggested that the amount of solid salt within the anode cell may be checked by the use of a pre-marked dip stick. However, the use of such a dip stick would require the displacement of the power supply housing disclosed by Weaver as well as the removal of a stopper inserted into the plate covering the anode cell; furthermore, this approach requires the user to maintain the dip stick readily available for periodically checking the salt level.

Another problem which has been experienced with many prior art electrolytic pool chlorinators has been the formation of salt cakes around the anode within the anode cell, which salt cakes interfere with the flow of current in the anode cell and result in the decreased efficiency or complete shutoff of the chlorinator. U.S. Pat. No. 3,563,879 issued to Richards et al discloses an anode cell wherein a perforated disc and a slotted, upwardly-extending sleeve divide the anode cell into a first portion containing the anode and a second portion for containing rock salt. While the aforementioned anode cell construction tends to reduce the amount of solid sodium chloride deposited near the anode, the perforations within the perforated disc and the slots within the slotted sleeve are large enough to permit smaller crystals of sodium chloride to pass therethrough and become deposited near the anode.

A further problem which has been encountered with prior art pool chlorinators is their tendency to destroy and/or render passive the specially constructed anode elements witin such chlorinators whenever the chlorinator is inadvertently operated after consuming all of the sodium chloride initially added to the anode cell. Operation of the chlorinator when the anode element is surrounded by water lacking sodium chloride results in the passivation of the anode element, typically requiring complete replacement thereof.

Yet another disadvantage of many prior art pool chlorinators is the build-up of chlorine fumes within the anode cell, which fumes are objectionable and potentially dangerous to users who must open the anode cell in order to service and maintain the chlorinator. Those skilled in the art will appreciate that a chlorinator which eliminates such objectionable chlorine gas fumes provides significant advantages over such prior art chlorinators.

In addition, prior art electrolytic chlorinators often do not provide convenient access to the principal components requiring periodic servicing or replacement. In particular, the anode element and the ion permeable barrier used to separate the anode and cathode cells from one another are often inaccessible or difficult to reach once the chlorinator has been manufactured. In some instances, the power supply components used to impose a voltage across the anode and cathode terminals are also difficult to access and are not separable from the electrolytic cell.

Accordingly, it is an object of the present invention to provide an electrolytic pool chlorinator which efficiently and completely mixes chlorine gas liberated therefrom with a flow of water directed into the pool of water to be chlorinated.

It is a further object of the present invention to provide such a pool chlorinator wherein a relatively small quantity of water under relatively low pressure is sufficient to completely react with the chlorine gas liberated by the chlorinator.

It is still another object of the present invention to collect chlorine gas liberated by the chlorinator in a manner which avoids the dilution of the liberated chlorine gas with air or other gases.

It is yet another object of the present invention to provide such a pool chlorinator wherein the flow of water into which the liberated chlorine gas is introduced also serves to remove heat from the pool chlorinator.

It is a further object of the present invention to provide such a pool chlorinator which prevents dangerous accumulations of both chlorine gas and hydrogen gas.

It is a still further object of the present invention to provide a means for safely and automatically disposing of sodium hydroxide solution which overflows from the cathode cell of the pool chlorinator.

Another object of the present invention is to provide such a pool chlorinator which reduces the likelihood of caustic soda vapor from escaping from the cathode cell thereof.

Yet another object of the present invention is to provide such a pool chlorinator which prevents solid sodium chloride within the anode cell thereof from forming salt cakes proximate the anode element or otherwise interfering with the exchange of ions between the anode and cathode cells.

It is yet another object of the present invention to provide such a pool chlorinator wherein the amount of undissolved sodium chloride contained with the anode cell of the chlorinator may be quickly and conveniently determined.

It is a further object of the present invention to provide such a pool chlorinator which substantially lessens the likelihood of the chlorinator being inadvertently operated after the water surrounding the anode element within the anode cell has become depleted of sodium chloride.

A further object of the present invention is to provide such a pool chlorinator meeting the above-described objects while being of simple and relatively inexpensive construction and providing convenient access to all components likely to require servicing or replacement.

These and other objects of the present invention will become more apparent to those skilled in the art as the description thereof proceeds.

SUMMARY OF THE INVENTION

Briefly described, and in accordance with one embodiment thereof, the present invention relates to an electrolytic pool chlorinator including anode and cathode chambers separated by an ion permeable selective membrane. An anode and a cathode are diposed within the anode and cathode chambers respectively, and the anode chamber is filled with a sodium chloride solution, while the cathode chamber is initially filled with water.

An electrical power supply is provided for imposing a direct current electric potential across the anode and cathode to liberate chlorine gas at the anode and hydrogen gas at the cathode.

One aspect of the present invention relates to a baffle disposed within the anode chamber above the bottom wall thereof for dividing the anode chamber into an upper anode compartment and a lower anode compartment. The anode element is disposed below the baffle, and solid sodium chloride in the form of rock salt is deposited into the upper anode compartment and is supported by the upper surface of the baffle. The baffle includes one or more passages extending between the upper and lower anode compartments for admitting fresh sodium chloride solution from the upper anode compartment to the lower anode compartment while allowing depleted sodium chloride solution within the lower anode compartment to flow back into the upper anode compartment. Such passages within the baffle are sloped upwardly as each passage extends from the upper anode compartment to the lower anode compartment in order to prevent undissolved sodium chloride from passing therethrough into the lower anode compartment. The baffle is removably supported upon a lipped ring or flange extending essentially horizontally around the inner walls of the anode chamber for permitting convenient access to the anode element. Preferably, the portion of the baffle which includes the above-described sloped passages extends below the anode element for supporting a quantity of solid sodium chloride at a level within the anode chamber that is below the level of the anode element itself for insuring that any water within the lower anode compartment which extends as high as the anode element is in fluid communication with the undissolved sodium chloride supported atop the baffle.

In the preferred embodiment of the present invention the above-described sodium chloride baffle is so constructed as to serve as a chlorine gas collection component. The baffle includes a peripheral portion which is elevated with respect to the downwardly extending portion of the baffle in which the sloped passages are formed. The underside of the peripheral portion of the baffle collects chlorine gas liberated from the anode and intercepts such chlorine gas before it bubbles through the upper anode compartment. The pool chlorinator also includes a chlorine gas conduit or riser tube communicating with the underside of the baffle for conveying the collected chlorine gas to a point located outside of the anode chamber. Preferably, the lipped flange which rings the inner walls of the anode chamber in order to support the baffle is turned upwardly, while the peripheral edges of the baffle supported by the lipped flange are turned downwardly. In this manner, the lipped flange retains water adjacent the point of engagement between the lipped flange and the peripheral edge of the baffle in order to form a water seal which prevents chlorine gas from escaping around the peripheral edges of the baffle. The water seal is retained in effect even if the water level within the anode chamber subsequently falls below the level of the lipped flange.

Yet another aspect of the present invention relates to a level indicator mechanism incorporated within such an electrolytic pool chlorinator. The level indicator mechanism is vertically oriented and slidingly extends within a hole formed within the lid covering the upper end of the anode chamber. The level indicator mechanism has a foot at its lower end for resting upon any undissolved sodium chloride within the anode chamber. The relative height of the upper end of the level indicator mechanism thereby indicates the amount of undissolved sodium chloride still remaining within the anode chamber. Since chlorine gas is collected by the aforementioned baffle well below the lid covering the upper end of the anode chamber, the hole in the anode chamber lid through which the level indicator mechanism extends may serve to vent the upper portion of the anode chamber without diluting the chlorine gas collected from the anode chamber.

A further aspect of the present invention relates to the provision of a packed column in conjunction with such a pool chlorinator for reacting chlorine gas liberated by the chlorinator with a flow of water in order to form hypochlorous acid which may then be returned to the pool of water. The packed column is vertically oriented and contains a packed bed of ceramic berl saddles or other material providing a large surface area for contacting the chloride gas with the water flowing downwardly through the packed column. The above-described chlorine gas riser tube communicates with the upper end of the packed column for delivering chlorine gas thereto, and a pressurized water conduit also communicates with the upper end of the packed column for introducing a flow of water thereto. The lower end of the packed column discharges the water and reacted chlorine into a feeder mechanism for returning the same to the pool of water to be chlorinated.

In the preferred embodiment of the present invention, the packed column is disposed within the cathode chamber of the chlorinator for allowing the chlorinator to be assembled as a compact structure. In addition, the vertical walls of the packed column are relatively thin for allowing excessive heat with the cathode chamber to be transfered to the water flowing within the packed column.

The above-mentioned feeder mechanism preferably includes a feeder tank disposed below the bottom wall of the cathode chamber, and the lower end of the packed column extends through the bottom wall of the cathode chamber for communicating with the feeder tank. The feeder tank may advantageously include a valve interconnected within the pressurized water conduit for regulating the flow of water to the upper end of the packed column in order to help regulate the amount of water and reacted chlorine held by the feeder tank. The aforementioned valve is operated by a float arm responsive to the water level within the feeder tank. The pressurized water conduit may extend upwardly from the valve within the feeder tank, through the lower end of the packed column, and terminates proximate the upper end of the packed column.

Another aspect of the present invention relates to the provision of an overflow tube within the cathode chamber of the chlorinator. The overflow tube has an upper end located near the upper end of the cathode chamber for receiving excess caustic soda solution with the cathode chamber extending above the upper end of the overflow tube. The lower end of the overflow tube extends through the bottom wall of the cathode chamber into the feeder tank for mixing excess caustic soda with the contents thereof and returning the same to the pool of water. The lower end of the overflow tube is shaped in the form of a "J" for trapping liquid therein and thereby preventing the passage of hydrogen gas downwardly through the overflow tube, while preventing the passage of any unreacted chlorine gas upwardly through the overflow tube.

One further aspect of the present invention relates to a filler cap incorporating a hydrogen gas vent for use in conjunction with the cathode chamber of the pool chlorinator. The filler cap includes a vent for venting hydrogen gas from the chamber and is removable for exposing a filler hole through which water may be introduced into the cathode chamber. The hydrogen gas vent incorporated within the filler cap may include a winding path for cooling and condensing any caustic soda vapors vented from the cathode chamber and returning the same thereto.

BRIEF DESCRIPTION OF THE DRAWINGS

FIG. 2 is a perspective view of a baffle shown within the pool chlorinator illustrated in FIG. 1.

FIG. 3 is a cross-sectional view of the lower portion of the baffle shown in FIG. 2 and taken through lines 3—3 as shown in FIG. 2.

FIG. 4 is a cross-sectional view of the chlorinator shown in FIG. 1 taken through line 4—4 shown in FIG. 1.

FIG. 5 is a detailed view of the portion of the pool chlorinator indicated by dashed circle 5 within FIG. 1 and illustrates a water seal formed between the peripheral edges of the baffle and a lipped ring which supports the baffle.

FIG. 6 is an enlarged view of the portion of the pool chlorinator indicated by dashed circle 6 within FIG. 1.

FIG. 7 shows a ceramic berl saddle of the type used within the packed column of the pool chlorinator to contact the chlorine gas with a flow of water.

FIG. 8 is an enlarged view of the portion of the pool chlorinator indicated by dashed circle 8 within FIG. 1 and illustrates the manner in which a plunger within the float valve controls the flow of water to the packed column.

FIG. 9 illustrates a sodium hydroxide drain line and associated pinch clamp for allowing the cathode chamber to be partially drained.

FIG. 10 is a front view of a power supply housing containing a power supply used to apply a direct current potential across the anode and cathode terminals of the pool chlorinator.

FIG. 11 is a sectional view of a filler cap removably secured to the cathode chamber cover for venting hydrogen gas therefrom while condensing caustic soda vapors vented from the cathode chamber.

DETAILED DESCRIPTION OF THE PREFERRED EMBODIMENT

Figure 1:
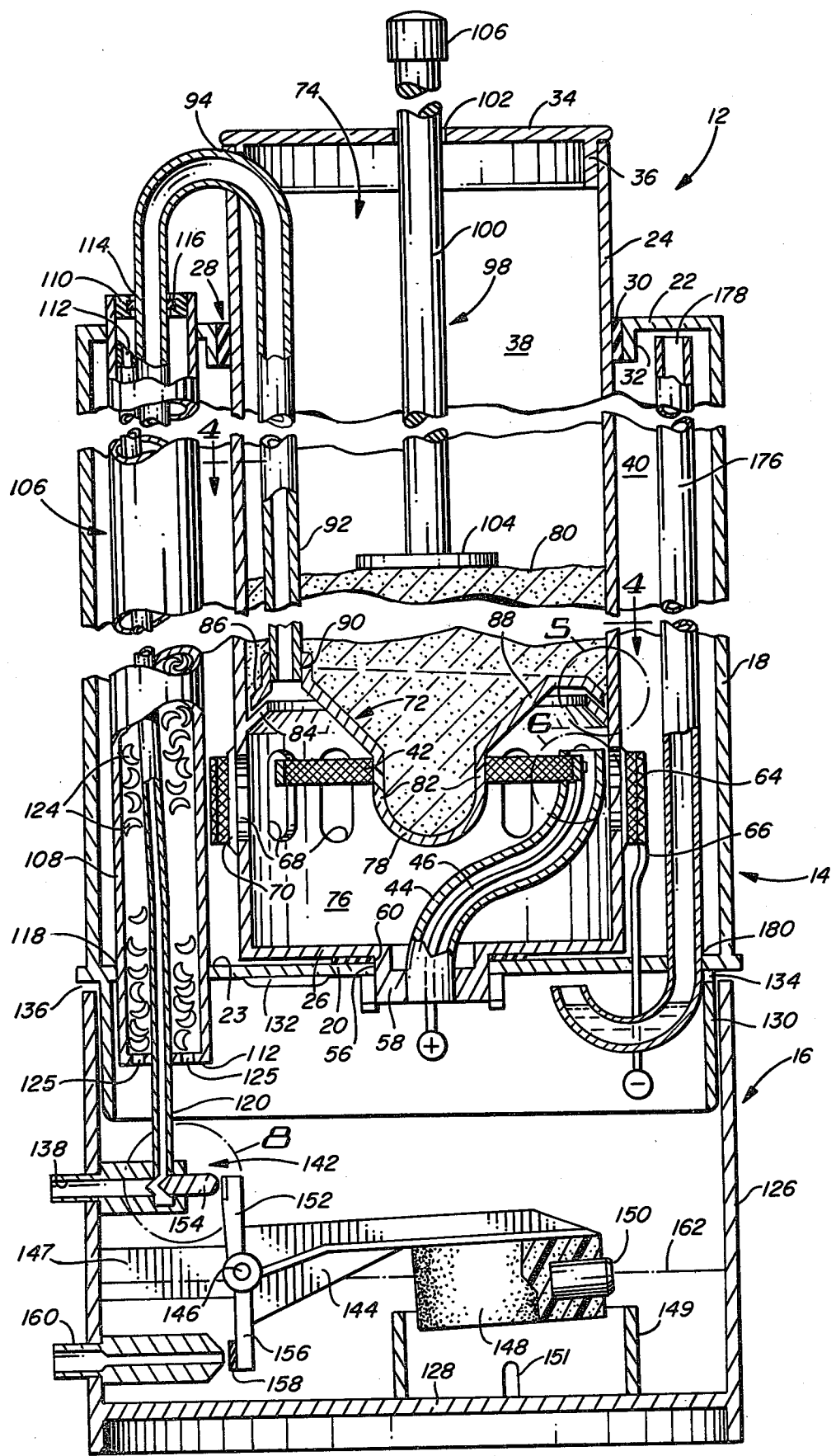
FIG. 1 is a cross-sectional view of an electrolytic pool chlorinator constructed in accordance with the teachings of the present invention.

The electrolytic pool chlorinator shown within FIG. 1 is designated generally by reference numeral 12 and includes an upper electrolytic cell section 14 and a lower feeder tank section 16. Electrolytic cell section 14 includes a first vertically-oriented cylindrical housing including cylinder 18, bottom horizontal wall 20, and a horizontal cover 22. The lower end of cylinder 18 is welded to the upper surface 23 of bottom wall 20. Preferably, cylinder 18, bottom wall 20, and cover 22 are formed of polyvinyl chloride (PVC) tubing and sheet material, and welds therebetween are formed by the application of PVC cement to the junctions therebetween. Polyvinyl chloride material is prefered for construction of the majority of the structural components within chlorinator 12 as such PVC material is relatively inexpensive and is immune to corrosive environments. Similarly, cover 22 is welded to the upper end of cylinder 18.

Chlorinator 12 includes a second cylindrical housing having a vertically-oriented cylinder 24 and a bottom wall 26, each of which is preferably formed of PVC material. Bottom wall 26 is welded to the lower end of cylinder 24, as by PVC cement. As shown within FIG. 1, bottom wall 26 of the second cylindrical housing normally lies above and adjacent to bottom wall 20 of the first cylindrical housing. Cylinder 24 extends upwardly through a hole 28 formed within cover 22. A water-tight releasable seal is formed between the outer wall of cylinder 24 and cover 22 by a neoprene gasket 30 bonded to the outer wall of cylinder 24, which neoprene gasket sealingly engages the edges of lide 22 forming hole 28. As shown within FIG. 1, lid 22 may include a downwardly turned ring 32 bordering hole 28 in order to provide additional contact area between lid 22 and gasket 30. The upper end of cylinder 24 is covered by a removable lid 34. A downwardly turned flange or sleeve 36 extends from the underside of lid 34 for nesting within the upper end of cylinder 24.

The second cylindrical housing formed by cylinder 24, bottom wall 26, and lid 34 forms an anode chamber 38 of the electrolytic pool chlorinator. The volume bounded by the outer wall of cylinder 24 and the first cylindrical housing formed by cylinder 18, bottom wall 20 and cover 22, defines a cathode chamber 40 of the electrolytic pool chlorinator.

Supported within the lower portion of anode chamber 38 is an anode 42 formed as a circular band having a diameter slightly less than the inner diameter of cylinder 24. Anode 42 is preferably made of Dimensionally Stable Anode Material of the type commercially available from Diamond Shamrock Corporation of Dallas, Tex., which material is made of Titanium coated with Ruthium. Such anodes are virtually immune to the corrosive effects of a super-saturated sodium chloride solution. Anode 42 is supported within anode chamber 38 by a curved PVC tube 44, the lower end of which extends through and is supported by the center of bottom wall 26. In the preferred embodiment of the present invention, the lower end of curved tube 44 is threaded for mating with a correspondingly threaded hole formed within the center of bottom wall 26. In this manner, anode 42 and curved tube 44 may be easily unthreaded from anode chamber 38 for servicing or replacement should the need arise. As shown within FIG. 1, a wire 46 extends upwardly through curved tube 44 from the lower end thereof for applying a voltage to anode 42.

Referring briefly to FIG. 6, the manner in which anode 42 is supported by the upper end of curved tube 44 is shown in greater detail. A slot 48 is cut vertically downward through the upper end of curved tube 44 for allowing a portion of anode 42 to be slid downwardly therethrough. The width of slot 48 is commensurate with the thickness of the material from which band-shaped anode 42 is made. A hole is drilled through the portion of anode 42 received by slot 48, and a screw 50 is extended through the hold for securing the bared end of wire 46 thereto. Nut 52 tightens screw 50 against anode 42. The entire upper end of curved tube 44 is then filled with an epoxy material, a portion of which is designated by reference numeral 54, to seal slot 48 and the upper end of curved tube 44 from the contents of anode chamber 38.

As shown in FIG. 1, a hole 56 is formed within the central portion of bottom wall 23 of cathode chamber 40 for allowing the passage of a downwardly extending sleeve portion 58 of bottom wall 26. A water-tight seal is formed between bottom wall 26 of anode chamber 38 and bottom wall 23 of cathode chamber 40 by inserting a ring-shaped neoprene gasket 60 therebetween. The portion of sleeve 58 which extends below bottom wall 20 is preferably threaded for receiving a nut 62 which releasably secures bottom wall 26 of anode chamber 38 against bottom wall 23 of cathode chamber 40.

Still referring to FIG. 1, a cathode 64 is disposed within the lower portion of cathode chamber 40 at a height corresponding to that of anode 42. Cathode 64 is formed by a 1-inch wide strip of 16 gauge, type 304 CRES steel formed into a circular band of a diameter slightly larger than that of the outer wall of cylinder 24. Cathode 64 encircles cylinder 24 and is spaced apart slightly therefrom. Cathode 64 is supported by a bracket 66 which extends through a hole formed within bottom wall 23 of cathode chamber 40. The hole through which bracket 66 extends is then sealed with epoxy or the like to prevent leakage of liquid therethrough. The lower end of bracket 66 extending below bottom wall 23 is provided with a negative supply voltage terminal for being coupled to the negative terminal of an associated power supply. Bracket 66 is made of an electrically conductive material for electrically coupling cathode 64 to the negative supply terminal.

As shown in FIG. 1, the lower portion of cylinder 24 has a series of holes 68 formed therein at periodic intervals for allowing the flow of current between anode 42 and cathode 64. Holes 68 are covered by an ion permeable selective membrane 70 which is wrapped about the outer wall of cylinder 24 adjacent hole 68. Membrane 70 extends above the uppermost portions of hole 68 and extends below the lowermost portions of hole 68 and is secured against the outer wall of cylinder 24 by band clamps or the like which seal the upper and lower portions of membrane 70 against cylinder 24. Membrane 70 is preferably formed of "NAFION" brand perfluorosulfonic acid membrane, commercially available from E. I. DuPont de Nemorurs & Company of Wilmington, Del. Membrane 70 thus divides anode chamber 38 from cathode chamber 40.

The manner in which anode 42, cathode 64, and membrane 70 cooperate to generate chlorine gas within the electrolytic pool chlorinator 12 will now be briefly described. Anode chamber 38 is initially charged with a quantity of rock salt and is filled with water to form a sodium chloride solution, while cathode chamber 40 is initially filled with water. Upon the application of a direct current electrical potential of approximately 3–5 volts across anode 42 and cathode 64, (anode 42 being positive with respect to cathode 64), negatively charged chloride ions are attracted to the positively charged anode 42, while the positively charged sodium ions are attracted toward the negatively charged cathode 68. Membrane 70 is permeable to positively charged ions (cations) but is impermeable to negatively charged ions (anions). Accordingly, positively charged sodium ions freely pass through membrane 70 toward cathode 64. An electrochemical reaction occurs at anode 42 which may be described according to the following formula:

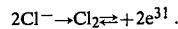

The electrochemical reaction which occurs at cathode 64 may be described as follows:

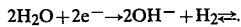

The negatively charged hydroxyl ions, while attracted toward the positively charged anode 42, are prevented passing through membrane 70. The result is that chlorine gas is liberated within anode chamber 38 and hydrogen gas is liberated within cathode chamber 40. The sodium chloride within anode chamber 38 is eventually consumed by this reaction, while cathode chamber 40 accumulates a sodium hydroxide solution (caustic soda). In practice, cathode chamber 40 must periodically be drained to reduce the concentration of sodium hydroxide therein, since a small amount of back migration of hydroxyl ions through membrane 70 would otherwise result.

In some prior art pool chlorinators known to the present inventor, sodium chloride is deposited within the anode chamber around the anode whereby the anode becomes essentially surrounded by solid sodium chloride. However, it has been found that deposits of solid sodium chloride adjacent the anode tend to increase the electrical resistance of the anode chamber, thereby producing additional heat build-up within the anode chamber and decreasing the rate at which chlorine gas may be generated. It has also been discovered that deposits of solid sodium chloride can form so-called salt cakes around the anode, which salt cakes effectively prevent the conduction of current therethrough. The formation of such salt cakes between the anode and the permeable membrane prevent or greatly diminish the ability of the pool chlorinator to generate chlorine gas. Accordingly, the pool chlorinator shown within FIG. 1 includes a baffle 72 disposed within anode chamber 38. Baffle 72 extends substantially across the inner walls of cylinder 24 and divides anode chamber 38 into an upper anode compartment 74 and a lower anode compartment 76. Baffle 72 is molded from PVC sheet material and includes a central portion 78 which extends downwardly below anode 42. As shown in FIG. 1, the entire upper surface of baffle 72 provides support for a quantity of solid sodium chloride, designated within FIG. 1 by reference numeral 80. The central portion 78 of baffle 72 forms a pocket for supporting a quantity of solid sodium chloride at a level below anode 42. The significance of this feature of baffle 72 is described in greater detail below.

With reference jointly to FIGS. 1, 2 and 3, central portion 78 of baffle 72 includes a plurality of passages 82 which slope upwardly when passing from upper anode compartment 74 to lower anode compartment 76. When anode chamber 38 is filled with water, sloped passages 82 allow relatively dense concentrated sodium chloride solution to flow from upper anode compartment 74 to lower anode compartment 76, while allowing the less-dense depleted sodium chloride solution within lower anode compartment 76 to pass upwardly into upper anode compartment 74. Nonetheless, due to the slope of passages 82, solid sodium chloride is prevented from passing into lower anode compartment 76.

Two separate and distinct advantages are provided by forming sloped passages 82 below the level of anode 42. First, any water within lower anode compartment 76 which reaches the level of anode 42 is in fluid communication through passage 82 with the sodium chloride pocket formed in central portion 78 of baffle 72. Assuming that proper amounts of salt and water were initi...ly deposited within anode chamber 38, the water within anode chamber 38 will always be depleted before the initially deposited quantity of sodium chloride is depleted. Thus, any water which surrounds anode 42 will always be saturated with sodium chloride, thereby preventing anode 42 from being passivated due to inadvertent operation of the chlorinator beyond ordinary service intervals. Secondly, the location of passages 82 below anode 42 prevents chlorine gas liberated from anode 42 from passing into the upper anode compartment 74 and creating accumulations of chlorine gas therein.

With reference to FIG. 1, an upwardly extending lip or flange 84 rings the inner wall of cylinder 24 in order to removably support baffle 72 within anode chamber 38. As shown in FIGS. 1, 2 and 5, baffle 72 includes a downwardly turned outer edge 86 which engages and rests upon lip 84 for supporting baffle 72. In this manner, baffle 72 is securely supported within anode chamber 38, while being easily removable therefrom for permitting access to anode 42.

It will be recalled that among the objects of the present invention are to provide a mechanism for collecting chlorine gas liberated from anode 42 without diluting the same with air or other gases and to prevent the accumulation of objectionable and dangerous chlorine fumes within upper anode compartment 74. In this regard, the preferred embodiment of the present invention shown in FIG. 1 utilizes baffle 72 to collect chlorine gas liberated by anode 42. As shown best in FIGS. 1 and 2, baffle 72 includes a peripheral portion 88 surrounding central portion 78 and elevated with respect thereto. The uppermost portions of the underside of peripheral portion 88 form a circular chlorine gas collection channel As shown in FIG. 1, baffle 72 is formed to include an upwardly extending nipple 90 for receiving the lower end of chlorine gas riser tube 92. The lower end of riser tube 92 communicates with the underside of peripheral portion 88 for receiving the collected chlorine gas and conveying it to a point external from anode chamber 38. As shown in FIG. 1, the upper end of riser tube 92 extends through a hole 94 formed in cylinder 24 for delivering the collected chlorine gas to a desired location. While the aforementioned circular chlorine gas collection channel formed by the uppermost portions of the underside of peripheral portion 88 may be generally horizontal, the chlorine gas collection channel is preferably sloped upwardly toward nipple 90 for guiding chlorine gas bubbles thereto.

With reference to FIGS. 1 and 5, it will be noted that chlorine gas is prevented from escaping around peripheral edge 86 of baffle 72 by a water seal formed between peripheral edge 86 and lip 84. Even if the level of the water within anode chamber 38 falls below lip 84, a small quantity of water, designated by reference numeral 96 within FIG. 5, is trapped by upwardly extending lip 84 for sealing peripheral edge 86 against the escape of chlorine gas.

As mentioned above, another aspect of the present invention is to provide a mechanism for easily and conveniently determining the amount of undissolved sodium chloride remaining within upper anode compartment 74. In this regard, the preferred embodiment of the present invention includes a salt level indicator designated generally by reference numeral 98. Level indicator 98 includes a vertically-oriented PVC tube 100 which slidingly extends through a hole 102 formed within the center of anode chamber lid 34. The lower end of tube 100 is cemented to a horizontally disposed foot 104 formed by a circular plate of PVC material. The upper end of tube 100 is covered by a removable cap 106, and sand or other ballast may be poured into tube 98 by temporarily removing cap 106 in order to add weight to level indicator 98. In use, tube 100 slides downwardly through hole 102 until foot 104 rests upon the upper layer of undissolved sodium chloride supported by baffle 72. The height of cap 106 provides an easy and convenient reference for indicating the amount of yet undissolved sodium chloride remaining in anode chamber 38. When salt and/or water are to be added to anode chamber 38, lid 34 and level indicator 98 are removed for allowing access to anode chamber 38.

It will be recalled that a further aspect of the present invention regards the provision of an apparatus for efficiently and completely reacting the chlorine gas liberated by the chlorinator with a flow of water in order to form hypochlorous acid which may then be returned to the swimming pool or other body of water to be chlorinated. In this regard, the chlorinator illustrated in FIG. 1 includes a packed column designated generally by reference numeral 106. Packed column 106 is formed by a relatively thin-walled cylinder 108 closed at its upper end by a cover 110 and closed at its lower end by a bottom wall 112. While packed column 106 can be located externally from the remainder of the chlorinator components, packed column 106 extends within cathode chamber 40 of the preferred embodiment of the present invention. Incorporation of packed column 106 within cathode chamber 40 provides for a more compact overall structure. In addition, heat stored within the sodium hydroxide solution within cathode chamber 40 due to the operation of the pool chlorinator can be transferred to water flowing within packed column 106 for cooling the chlorinator. To this end, cylinder 108 is preferably formed of PVC tubing having a 0.060 inch thickness for maximizing heat transfer from the sodium hydroxide solution to the water flowing within packed column 106.

Still referring to FIG. 1, cover 110 of packed column 106 has a hole 114 formed therein for receiving the upper end of chlorine gas riser tube 92. An O-ring seal 116 is disposed within cover 110 surrounding hole 114 to prevent the passage of air into or chlorine gas out of packed column 106. The upper end of riser tube 92 terminates just below cover 110 for releasing chlorine gas into packed column 106.

As shown in FIG. 1, the upper end of cylinder 108 extends slightly above cover 22 through a correspondingly-sized hole formed therein. The outer wall of cylinder 108 is cemented to cover 22 to form an air-tight seal therebetween. In the preferred embodiment of the present invention, the lower end of cylinder 108 extends through a hole 118 within bottom wall 23 of anode chamber 40. The outer wall of cylinder 108 is cemented to bottom wall 23 to form a water-tight seal there between. A pressurized water conduit 120 extends into packed column 106 and communicates with the upper end thereof for introducing a flow of water to the top of packed column 106. In the preferred embodiment of the present invention, water conduit 120 is a section of PVC tubing which extends upwardly through the bottom wall 112 of packed column 106 and terminates in an upper open end 122 for dispensing water into packed column 106. The lower end of conduit 120 communicates with a source of water pressurized merely to the extent of raising water upwardly through conduit 120 to the upper end 122 thereof.

Packed column 106 is filled with a packed bed of material adapted to intermix and react the chlorine gas introduced by riser tube 92 with the water introduced by conduit 120. Such packing material is designated within FIG. 1 by reference numeral 124 and may correspond to ceramic berl saddles such as that designated by reference numeral 124' within FIG. 7. Berl saddles of this type are available from the Maurice A. Knight Division of Koch Engineering Company, Inc. Gas mixing is accomplished by the turbulent flow of gas through the distributed voids created by the packed bed. The packing generates a large amount of liquid-gas contact surface area over which the water is distributed for reacting with the chlorine gas. The use of such packed columns for gas-liquid contacting is described in greater detail in Section 18 of the "Chemical Engineers' Handbook", Fifth Edition, published by McGraw-Hill Book Company. The bottom wall 112 of packed column 106 has a plurality of holes 125 formed therein for discharging the water and reacted chlorine which fall under the force of gravity to the lower end of packed column 106. The water and reacted chlorine discharged through holes 125 fall into feeder tank section 16 described in greater detail below.

Feeder tank section 16 shown in FIG. 1 includes a cylindrical housing formed by cylinder 126 and a bottom horizontal wall 128. Cylinder 126 and bottom wall 128 are each preferably made of PVC material. Bottom wall 128 is cemented to the inner walls of cylinder 126 near the lower end thereof. As shown in FIG. 1, cylinder 126 may be of substantially the same diameter as cylinder 18 for allowing feeder tank section 16 to appear as an integral extension of cylinder 18 when the chlorinator is assembled. In order to facilitate the placement of upper electrolytic cell section 14 upon lower feeder tank section 16, a downwardly extending circular sleeve 130 is welded to the underside of bottom wall 23 of cathode chamber 40. The diameter of sleeve 130 is slightly less than the inner diameter of cylinder 126 to allow sleeve 130 to be nested therein. Vent holes, such as those designated 132 and 134 are formed within the upper portions of sleeve 130 for mating with corresponding vent holes, such as that designated 136 within the upper rim of cylinder 126, for ventilating any unreacted chlorine gas from feeder tank 16.

Feeder tank 16 incorporates a float valve arrangement for controlling both the flow of water into packed column 106, as well as the discharge of water from feeder tank 16 back to a swimming pool or other body of water to be chlorinated. As shown within FIGS. 1 and 8, a fitting 138 extends from feeder tank 16 through cylindrical wall 126 and is secured thereto by a nut 140. Fitting 138 is adapted to be coupled to a source of pressurized water. The source of pressurized water may be either a tube coupled to the municipal water system or a tube coupled to the return line of a swimming pool filtration system for receiving filtered pool water. Fitting 138 communicates with a valve assembly 142 which includes an outlet coupled to conduit 120 for regulating the flow of water into packed column 106. Float arm 144 is pivotally coupled at 146 to a supporting bracket 147. A water dampening chamber 149 is formed by a vertically-extending section of PVC tubing cemented at its lower end to bottom wall 128 of feeder tank 16. A hole 150 is formed in the lower end of water chamber 149 for allowing water to drain therefrom. A float 148 is secured to the end of float arm 144 opposite pivot point 146 and extends downwardly therefrom into water chamber 149; a weight 150 is inserted within float 148 for forcing float arm 144 to turn in a clockwise direction about pivot point 146 whenever float 148 is not buoyed upward by water within feeder tank 16. Extending upwardly from float arm 144 adjacent pivot point 146 is an arm 152 which selectively engages a plunger 154 extending from valve assembly 142. A second arm 156 extends downwardly from float arm 144 adjacent pivot point 146. The lower end of arm 156 is provided with a rubber pad 158 which operates in conjunction with a water outlet fitting 160 extending through cylinder 126 near the lower end thereof. Fitting 160 is typically coupled by a tube (not shown) to the suction side of a pool pump for withdrawing chlorinated water from feeder tank 16.

Ordinarily, float arm 144 is bouyed upward by float 148 for permitting chlorinated water to be freely suctioned out of feeder tank 16 through fitting 160. However, if the water level within feeder tank 16 drops substantially below the level indicated by dashed line 162, then water within water dampening chamber 149 will drain therefrom and allow float 148 to fall. Float arm 144 then rotates clockwise about pivot point 146, and then pad 158 seals fitting 160 and thereby prevents additional amounts of water from being suctioned from feeder tank 16. This feature assures that no air will be suctioned through fitting 160 into the pool pump when the pump is shut off even if water is subsequently siphoned from the pool pump back into the pool. Water dampening chamber 149 and hole 151 therein function to dampen the response of float arm 144 to variations in the feeder tank water level and thereby prevent rapid oscillations of float arm 144.

Referring again to FIG. 8, support bracket 147 includes a member 164 through which fitting 138 extends for retaining support bracket 147 against cylinder 126. While not shown in the drawings, water outlet fitting 160 may also extend through member 164 to further secure support bracket 147 to cylinder 126. A gasket 166 is inserted between member 164 and cylinder 126 for forming a compression seal therebetween. As shown in FIG. 8, valve assembly 142 includes a threaded bore 170 which threadedly engages the internal end of fitting 138. Fitting 138 includes an orifice 172 through which water is introduced into valve assembly 142. Plunger 154 includes a rubber pad 174 which is advanced toward orifice 172 by arm 152 whenever the water level within feeder tank 16 rises substantially above the water level designated by dashed line 162 for restricting the flow of water through conduit 120 into packed column 106. When the level of water within feeder tank 16 again recedes, the pressure of the water directed through orifice 172 against pad 174 pushes plunger 154 to the right (with respect to FIG. 8) for again allowing water to flow to packed column 106. Thus, float arm 144, valve assembly 142, and outlet fitting 160 cooperate with one another to regulate the water level within feeder tank 16.

It will be recalled that a further object of the present invention is to provide a method of safely disposing of excess sodium hydroxide solution with cathode chamber 40. In this regard, an overflow tube 176 is disposed within cathode chamber 40 and has an open upper end 178 located just below cover 22 for receiving any water or sodium hydroxide solution within cathode chamber 40 which extends above upper end 178 of overflow tube 176. The lower end of overflow tube 176 extends through a hole 180 within bottom wall 23 of cathode chamber 40 and into the upper portion of feeder tank 16 for delivering thereto any excess water or sodium hydroxide solution which overflows from cathode chamber 40. As shown in FIG. 1, the lower end of overflow tube 176 is preferably J-shaped for trapping liquid therein in order to prevent the passage of hydrogen gas downwardly therethrough and in order to prevent the passage of chlorine gas upwardly therethrough.

The manner in which overflow tube 176 contributes toward preventing accumulations of hydrogen gas within cathode chamber 40 will now be explained. Prior to initial operation of electrolytic pool chlorinator 12, cathode chamber 40 is filled with water until water overflows from cathode chamber 40 into feeder tank 16. Thus, the water level within cathode chmaber 40 is initially maintained just below cover 22, leaving only a small volume available for hydrogen gas accumulations. During operation of chlorinator 12, water within anode chamber 38 migrates into cathode chamber 40 in the process of transferring sodium ions across permeable membrane 70. Consequently, the water level within cathode chamber 40 tends to rise. As the level of the water/sodium chloride solution within anode chamber 40 exceeds the open upper end 178 of overflow tube 176, the overflow spills into feeder tank 16. The small amount of sodium hydroxide solution which periodically overflows from cathode chamber 40 is intermixed with and diluted by the water within feeder tank 16 and ultimately discharged to the swimming pool. To a small extent, the sodium hydroxide solution thus discharged tends to offset the pH lowering effect of the hydrochloric acid formed within packed column 106 when chlorine gas is reacted with water therein. The J-shaped lower end of overflow tube 176 prevents intermixing of hydrogen gas within anode chamber 40 and any unreacted chlorine gas within feeder tank 16, thereby eliminating the risk of a fire or explosion resulting from the reaction thereof.

It may be recalled that it is periodically necessary to drain the contents of cathode chamber 40 to prevent the concentration of sodium hydroxide solution therein from becoming excessive. With reference to FIG. 9, a drain tube 184 extends upwardly into cathode chamber 40 through a hole 186 in bottom wall 23. Drain tube 184 includes an open upper end 188 for draining the sodium hydroxide solution within cathode chamber 40 down to the level indicated by dashed lines 190. The lower end of drain tube 184 is provided with a pinch clamp for normally closing off the lower end of drain tube 184. At periodic service intervals, the lower end of drain tube 184 is extended through a removable door (not shown) within cylinder 126 of feeder tank 16, and pinch clamp 192 is released for allowing sodium hydroxide solution to drain from cathode chamber 40 into a sewer line. Pinch clamp 192 is then reinstalled, and cathode chamber 40 is refilled with water.

As described above, chlorinator 12 includes an electrical power supply coupled to the anode and cathode terminals for imposing a direct current electrical potential thereacross in order to generate chlorine gas. FIG. 10 illustrates the power supply housing containing the aforementioned power supply. Power supply housing 194 has a pair of wires 196 extending therefrom for receiving an A.C. input voltage. Preferably, wires 196 are coupled in parallel with other wires (not shown) supplying power to the pump motor within the filtration system of the swimming pool. In this manner, it can be assured that chlorinator 12 and the pool pump will work in tandem with one another. Also extending from power supply housing 194 are positive wire 198 and negative wire 200, which wires are coupled to the corresponding positive and negative terminals disposed beneath bottom wall 23 for impressing a direct current voltage of from 3 to 5 volts across anode 42 and cathode 64. Wires 198 and 200 may be fed through appropriate holes in the upper portion of feeder tank 16. Also shown extending from power supply housing 194 is a control knob 202 for allowing the chlorinator to be shut off and for regulating the output voltage provided across wires 198 and 200. By varying the voltage applied across the anode and cathode terminals, the current conducted therebetween may be varied, and hence the rate at which chlorine gas is generated may also be varied. The current amperage flowing through output wires 198 and 200 is monitored by an ammeter 204 mounted within power supply housing 194. A circuit breaker reset button 206 also protrudes from power supply housing 194 to reset a current limiting circuit breaker incorporated within the power supply. A circuit schematic of the power supply is not illustrated herein since such power supplies are well known in the art. A preferred manner of constructing such a power supply includes the use of a power transformer having a multiple tapped primary coil to provide 5 output voltage settings of 3 volts through 5 volts. Control knob 202 may be coupled to a six-position switch for either decoupling the A.C. input voltage from the transformer primary or coupling the A.C. input voltage to one of the five tap points along the primary coil to provide the five different output voltage settings. A simple rectifier circuit may be used to convert the A.C. output voltage to a direct current potential.

It will be recalled that yet another object of the present invention is to provide a mechanism for venting hydrogen gas from the upper portion of cathode chamber 40 while restricting the escape of caustic soda vapor therefrom. In this regard, FIG. 11 illustrates a filler cap 208 removably secured over a filler hole 210 formed within cathode chamber cover 22. Filler cap 208 may be removed by the user to expose filler hole 210 for initially filling or refilling cathode chamber 40 with water. Filler cap 208 includes a vented and winding passageway 212 preferably constructed from copper tubing. The lower end of passageway 212 is in communication with the upper portion of anode chamber 40 for receiving hydrogen gas and caustic soda vapor escaping therefrom. The lower end of filler cap 208 is sealed, as designated by region 214. Filler cap 208 has cylindrical side walls 216 which include perforations such as those designated by reference numeral 218 for allowing cool ambient air to circulate over copper tube 212. A cover 220 extends above cylindrical side walls 216 for preventing debris from collecting therein. Cover 220 is spaced apart from cylindrical side walls 216 at intervals to form vents, such as the vent designated by reference numeral 222 within FIG. 11, for allowing hydrogen gas discharged from the upper end of copper tube 212 to be vented to the atmosphere. On the other hand, hot caustic soda vapor discharged from cathode chamber 40 through filler cap 208 is cooled within copper tube 212 and condenses back into liquid form. The condensed caustic soda falls under the force of gravity back toward the lower end of copper tube 212 and into cathode chamber 40.

It should now be appreciated by those skilled in the art that an electrolytic pool chlorinator for chlorinating a swimming pool or the like has been described which provides many unique advantages in comparison with prior art electrolytic chlorinators and which fully meets all of the abovestated objects of the present invention. The chlorinator is of relatively simple and inexpensive construction and is so constructed as to provide convenient access to the anode, cathode, and ion permeable selective membrane should the need for servicing these components arise. Baffle 72 is easily removable for providing access to anode 42. In addition, cylinder 24 and bottom wall 26 forming anode chamber 38 are easily removable from cathode chamber 40 to allow servicing of the ion permeable membrane as well as cathode 64. Furthermore, location of feeder tank 16 below cathode chamber 40 insures that any leakage of sodium hydroxide solution from cathode chamber 40 is caught by feeder tank 16 and diluted with water contained thereby.

While the invention has been described with reference to a preferred embodiment thereof, the description is for illustrative purposes only and is not to be contrued as limiting the scope of the invention. Various modifications and changes may be made by those skilled in the art without departing from the true spirit and scope of the invention as defined by the appended claims.

I claim:

1. An electrolytic pool chlorinator comprising in combination:
    (a) an anode chamber for containing a sodium chloride solution, said anode chamber having an uppermost end through which water and sodium chloride may be introduced into said anode chamber, the uppermost end of said anode chamber being closed by a removable cover;
    (b) an anode disposed within said anode chamber;
    (c) a cathode chamber disposed adjacent said anode chamber for containing water and having upper and lower opposing ends;
    (d) a cathode disposed within said cathode chamber;
    (e) a ion permeable selective membrane dividing said anode chamber from said cathode chamber and allowing sodium ions to pass through said membrane from said anode chamber to said cathode chamber while substantially preventing both chloride ions within said anode chamber and hydroxyl ions within said cathode chamber from passing through said membrane;
    (f) an electrical power supply coupled to said anode and to said cathode for imposing a direct current electrical potential thereacross and for liberating chlorine gas at said anode and hydrogen gas at said cathode;
    (g) chlorine gas collection means disposed within said anode chamber above said anode and below said removable cover, said chlorine gas collection means being adapted to be immersed within the sodium chloride solution contained by said anode chamber for collecting chlorine gas liberated at said anode, said chlorine gas collection means allowing sodium chloride solution to pass therethrough while preventing the chlorine gas from reaching said removable cover; and
    (h) a conduit having a first end coupled to said chlorine gas collection means and a second end opposite thereto, the second end of said conduit being external to said anode chamber for conveying the collected chlorine gas to a point external from said anode chamber.

2. A pool chlorinator as recited by claim 1 wherein:
    (a) said anode chamber is bounded by the inner wall of a vertically-oriented cylinder;
    (b) said chlorine gas collection means includes a baffle having a generally circular, downwardly turned peripheral edge; and
    (c) said anode chamber includes a horizontally-oriented lipped ring secured to the inner wall of said vertically-oriented cylinder, said lipped ring being upwardly turned for engaging and supporting the peripheral edge of said baffle and for trapping water in the vicinity of the point of engagement between the peripheral edge of said baffle and said lipped ring to form a water seal therebetween.

3. A pool chlorinator as recited by claim 2 wherein said conduit is a riser tube extending upwardly from said baffle and passing through said vertically-oriented cylinder proximate an upper end thereof.

4. An electrolytic pool chlorinator of the type wherein sodium chloride must be periodically added thereto, comprising in combination:
    (a) an anode chamber for containing a quantity of water and a quantity of sodium chloride, said anode chamber including a bottom wall and including side walls extending upwardly from said bottom wall;
    (b) a baffle disposed within said anode chamber above the bottom wall thereof and adapted to be immersed within the water contained thereby, said baffle extending between the side walls of said anode chamber to divide said anode chamber into an upper anode compartment disposed above said baffle for supporting a quantity of undissolved sodium chloride and a lower anode compartment disposed below said baffle;
    (c) an anode disposed within said lower anode compartment;
    (d) a cathode chamber disposed adjacent said anode chamber for containing water;
    (e) a cathode disposed within said cathode chamber;
    (f) an ion permeable selective membrane dividing said anode chamber from said cathode chamber and allowing sodium ions to pass through said membrane from said anode chamber to said cathode chamber while substantially preventing both chloride ions within said anode chamber and hydroxyl ions with said cathode chamber from passing through said membrane;
    (g) an electrical power supply coupled to said anode and to said cathode for imposing a direct current electrical potential thereacross and for liberating chlorine gas at said anode and hydrogen gas at said cathode;
    (h) said baffle having at least one passage formed therein, said passage extending between said upper and lower anode compartments for exchanging sodium chloride solution between said upper anode compartment and said lower anode compartment, said baffle extending downwardly below said anode, said at least one passage being disposed below said anode for ensuring that water within said lower anode compartment having a level exceeding that of said anode is charged with sodium chloride in solution therewith.

5. A pool chlorinator as recited by claim 4 wherein said baffle includes a downwardly extending portion within which said at least one passage is formed, said baffle including an elevated portion having an underside serving to collect chlorine gas liberated from said anode, said pool chlorinator further including a conduit having a lower end communicating with the underside of the elevated portion of said baffle for receiving the collected chlorine gas, said conduit extending upwardly from its lower end through said upper anode compartment and extending through one of the side walls of said anode chamber to convey the collected chlorine gas to a point external from said anode chamber.

6. A pool chlorinator as recited by claim 5 wherein:
 (a) said anode chamber includes a horizontally-oriented lipped flange secured to the side walls of said anode chamber, said lipped flange being upwardly turned;
 (b) said baffle has outer edges which engage and rest upon said lipped flange for supporting said baffle within said anode chamber, the outer edges of said baffle being downwardly turned; and
 (c) said lipped flange trapping water in the vicinity of the point of engagement between the outer edges of said baffle and said lipped flange to form a water seal therebetween to prevent the escape of collected chlorine gas from around the outer edges of said baffle.

7. An electrolytic pool chlorinator as recited in claim 4 wherein said anode chamber includes:
 (a) upper and lower opposing ends, the upper end of said anode chamber being closed by a lid having a hole formed therein;
 (b) level indicator means vertically disposed and slightly extended within the hole in said anode chamber lid, said lever indicator means having a foot at the lower end thereof for resting upon undissolved sodium chloride contained within said anode chamber, the height of said level indicator means relative to said anode chamber lid indicating the relative amount of undissolved sodium chloride remaining within said anode chamber.

8. An electrolytic pool chlorinator comprising in combination:
 (a) an anode chamber for containing a sodium chloride solution;
 (b) an anode disposed within said anode chamber;
 (c) a cathode chamber disposed adjacent said anode chamber for containing water and having upper and lower opposing ends;
 (d) a cathode dispersed within said cathode chamber;
 (e) an ion permeable selective membrane dividing said anode chamber from said cathode chamber and allowing sodium ions to pass through said membrane from said anode chamber to said cathode chamber while substantially preventing both chloride ions within said anode chamber and hydroxyl ions within said cathode chamber from passing through said membrane;
 (f) an electrical power supply coupled to said anode and to said cathode for imposing a direct current electrical potential thereacross and for liberating chlorine gas at said anode and hydrogen gas at said cathode;
 (g) a vertically-oriented packed column having upper and lower ends and containing a packed bed of material adapted to intermix water and chlorine gas to form hypochlorous and hydrochloric acid;
 (h) a chlorine gas conduit having a first end communicating with said anode chamber for receiving chlorine gas therefrom and a second end communicating with the upper end of said packed column for conveying chlorine gas thereto;
 (i) a water conduit having a first end for receiving water and having a second end communicating with the upper end of said packed column for introducing water thereto; and
 (j) feeder means coupled to the lower end of said packed column for receiving the intermixed water and chlorine gas discharged therefrom and conveying the same to a pool of water.

9. A pool chlorinator as recited by claim 8 wherein said feeder means includes:
 (a) a feeder tank in fluid communication with the lower end of said packed column for receiving the water and chlorine mixture discharged therefrom;
 (b) a return conduit extending from said feeder tank and adapted to be coupled to the suction side of a pool pump;
 (c) a valve interconnected within said water conduit for regulating the flow of water to said packed column, said valve including a plunger extending therefrom, said plunger decreasing the flow of water through said valve when depressed; and
 (d) a float arm pivotally suspended within said feeder tank and responsive to the level of the water contained therein for selectively depressing said plunger when the level of the water within said feeder tank rises above a predetermined level.

10. A pool chlorinator as recited by claim 9 wherein said feeder tank has an upper portion disposed above said predetermined water level and wherein the upper portion of said feeder tank is vented to prevent accumulations of chlorine gas therein.

11. A pool chlorinator as recited by claim 9 wherein:
 (a) said cathode chamber includes a bottom wall;
 (b) said feeder tank is disposed below the bottom wall of said cathode chamber;
 (c) said packed column is disposed within said cathode chamber, the lower end of said packed column extending through the bottom wall of said cathode chamber for communicating with said feeder tank; and
 (d) said water conduit extends upwardly through the lower end of said packed column toward the upper end thereof.

12. A pool chlorinator as recited by claim 11 wherein said cathode chamber includes an overflow tube having an upper end located near the upper end of said cathode chamber for receiving any liquid within said cathode chamber extending above the upper end of said overflow tube, said overflow tube also having a lower end extending through the bottom wall of said cathode chamber into said feeder tank for delivering any fluid received by the upper end thereof into said feeder tank.

13. A pool chlorinator as recited by claim 12 wherein the lower end of said overflow tube is J-shaped for trapping liquid therein in order to prevent the passage of hydrogen gas or chlorine gas therethrough.

14. A pool chlorinator as recited by claim 8 wherein said packed column is disposed within said cathode chamber.

15. A pool chlorinator as recited by claim 14 wherein said packed column includes relatively thin vertical walls for transferring heat from the water within said cathode chamber to the water discharged from said packed column in order to cool said pool chlorinator.

16. A pool chlorinator as recited by claim 8 wherein said cathode chamber includes a cover closing the upper end thereof and a filler cap secured to said cover and removable therefrom for exposing a filler hole within said cover to permit said cathode chamber to be filled with water, said filler cap including a vent for venting hydrogen gas from said cathode chamber.

17. A pool chlorinator as recited by claim 16 wherein said filler cap incorporates a winding path for conveying vapors vented from said cathode chamber to the atmosphere, said winding path allowing hydrogen gas to escape therethrough while condensing any caustic vapors and returning the same to said cathode chamber.

18. A pool chlorinator as recited by claim 8 wherein said packed bed of material comprises ceramic berl saddles.

* * * * *